(12) United States Patent
Ohtomo

(10) Patent No.: US 8,896,266 B2
(45) Date of Patent: Nov. 25, 2014

(54) ELECTRIC CHARGING SYSTEM AND ELECTRIC VEHICLE

(75) Inventor: Yosuke Ohtomo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 364 days.

(21) Appl. No.: 13/489,370

(22) Filed: Jun. 5, 2012

(65) Prior Publication Data

US 2012/0319648 A1  Dec. 20, 2012

(30) Foreign Application Priority Data

Jun. 15, 2011 (JP) .................................. 2011-133314

(51) Int. Cl.
*H02J 7/00* (2006.01)
*B60L 3/00* (2006.01)
*B60L 11/18* (2006.01)

(52) U.S. Cl.
CPC .............. *B60L 3/00* (2013.01); *Y02T 10/7088* (2013.01); *Y02T 10/7005* (2013.01); *B60L 2250/10* (2013.01); *B60L 11/1824* (2013.01); *B60L 3/0069* (2013.01); *Y02T 90/12* (2013.01); *Y02T 90/14* (2013.01)
USPC ............................. 320/109; 320/104; 320/132

(58) Field of Classification Search
CPC ... B60L 3/00; B60L 11/1824; B60L 2210/10; B60L 2250/10; Y02T 10/7088; Y02T 10/7005; Y02T 90/12; Y02T 90/14
USPC .................. 320/104, 109, 132, 134, 138, 160
See application file for complete search history.

(56) References Cited

U.S. PATENT DOCUMENTS

| | | | |
|---|---|---|---|
| 2006/0114635 A1* | 6/2006 | Laurent et al. | 361/160 |
| 2011/0251746 A1* | 10/2011 | Wu et al. | 701/22 |
| 2012/0105002 A1* | 5/2012 | Eikeland et al. | 320/109 |

FOREIGN PATENT DOCUMENTS

| | | |
|---|---|---|
| JP | 63-117072 | 7/1988 |
| JP | 2009-136110 A | 6/2009 |
| JP | 2010-238576 A | 10/2010 |

OTHER PUBLICATIONS

Notification of Reason(s) for Refusal dated Apr. 30, 2013.
Notification of Reason(s) for Refusal dated Aug. 27, 2013.

* cited by examiner

*Primary Examiner* — Vuthe Siek
(74) *Attorney, Agent, or Firm* — McGinn IP Law Group, PLLC

(57) ABSTRACT

An electric vehicle includes a power receiving connector that is connected to a battery via a relay, and an electric charger includes a power supply connector that is connected to the power receiving connector. When a high voltage is applied to the power receiving connector due to a weld failure of the relay, a warning lamp flashes to notify an operator of the risk. Then the connection state is detected between the connectors. When the connectors are not connected to each other, a warning buzzer issues a warning sound. When the connectors are connected to each other, the warning buzzer is turned off. The power receiving connector is covered by the power supply connector in this manner, the operator is unlikely come in contact with the power receiving connector, and thus the output of a warning sound from the warning buzzer is stopped.

6 Claims, 17 Drawing Sheets

ELECTRIC CHARGING SYSTEM AND ELECTRIC VEHICLE

CROSS REFERENCES TO RELATED APPLICATIONS

The present application claims priority from Japanese Patent Application No. 2011-133314 filed on Jun. 15, 2011, the entire contents of which are hereby incorporated by reference.

BACKGROUND OF THE INVENTION

1. Field of the Invention

The present invention relates to an electric charging system and an electric vehicle, and, in particular, to a technology that warns of a weld failure of a relay.

2. Description of the Related Art

In recent years, electric vehicles that are equipped with an electric motor for propulsion have been under development. The electric vehicle is equipped with an electric storage device such as battery. Upon charging the electric storage device, a power supply connector extending from an external electric charger is connected to a power receiving connector of the electric vehicle. Furthermore, in the field of hybrid electric vehicles that are equipped with an engine and an electric motor for propulsion, so called a plug-in type vehicle is under development whose electric storage device is charged with an external electric charger.

Since a terminal voltage of the electric storage device is applied to the power receiving connector provided to the electric vehicle, it is necessary to ensure safety during a charging operation that exposes the power receiving connector. Thus, a relay is provided to a current carrying line that connects the electric storage device and the power receiving connector. When the charging operation is not performed, the relay ic disconnected, thereby protecting the terminal voltage from being applied to the power receiving connector.

Since a large current is supplied to the relay thus provided on the current carrying line during charging, a weld failure may occur at the relay. Thus, an electric charging system is proposed that switches the relay to a disconnection state after charging is complete as well as monitors a voltage change due to the relay disconnection (see, for example, Japanese Unexamined Patent Application Publication No. 2010-238576). By using such an electric charging system, it is possible to detect a weld failure of the relay.

When a weld failure of the relay is detected, a terminal voltage of the electric storage device may be applied to the power receiving connector. Thus, it is necessary to warn an operator such as a driver. However, it is not desirable to continuously and unreasonably warn the operator when a weld failure of the relay is detected. For example, when a warning is continuously issued due to a weld failure and a new warning is further issued due to another failure, the operator may misunderstand the new failure. Therefore, it is necessary to properly issue a warning depending on a situation instead of issuing a warning simply according to a weld failure of the relay.

SUMMARY OF THE INVENTION

The present invention is made in view of the above, and it is an object of the present invention to properly issue a warning related to a weld failure that occurs at a relay.

An aspect of the present invention provides an electric charging system in which an electric vehicle is provided with a power receiving connector that is connected to an electric storage device via a relay unit, and the power receiving connector is connected to a power supply connector of an electric charger, whereby charging power is supplied to the electric storage device from the electric charger. The electric charging system includes: a information storage unit that stores information on a weld failure that occurs at the relay unit; a connection detection unit that detects a connection state between the power receiving connector and the power supply connector; and a warning unit that issues an warning when the power receiving connector is not connected to the power supply connector under a state where a weld failure occurs at the relay unit and stops issuing a warning when the power receiving connector is connected to the power supply connector under a state where a weld failure occurs at the relay unit.

Preferably, the electric charging system includes a cover that covers the power receiving connector. Furthermore, under a state in which a weld failure occurs at the relay unit and the power receiving connector is not covered by the cover, the warning unit issues a warning when the power receiving connector is not connected to the power supply connector and stops issuing a warning when the power receiving connector is connected to the power supply connector.

Preferably, the relay unit of the electric charging system includes a first relay that is disposed at one of a pair of current carrying lines connecting the electric storage device and the power receiving connector and a second relay that is disposed at the other one of the pair of the current carrying lines. Furthermore, a lock mechanism is provided that fixes the cover at a position for covering the power receiving connector when a weld failure occurs at both of the first relay and the second relay, and releases the fixing of the cover when a weld failure occurs at either one of the first relay and the second relay.

Preferably and alternatively, the relay unit of the electric charging system includes a first relay that is disposed at one of a pair of current carrying lines connecting the electric storage device and the power receiving connector and a second relay that is disposed at the other one of the pair of the current carrying lines. Furthermore, a warning that is issued from the warning unit when a weld failure occurs at both of the first relay and the second relay is different from a warning that is issued from the warning unit when a weld failure occurs at either one of the first relay and the second relay.

Preferably, the electric charging system has a second warning unit that issues a warning when a weld failure occurs at the relay unit.

Another aspect of the present invention provides an electric vehicle in which a power receiving connector is provided that is connected to an electric storage device via a relay unit and is connected to a power supply connector of an electric charger when the electric storage device is charged. The electric vehicle includes: an information storage unit that stores information on a weld failure that occurs at the relay unit; a connection detection unit that detects a connection state between the power receiving connector and the power supply connector; and a warning unit that issues an warning when the power receiving connector is not connected to the power supply connector under a state where a weld failure occurs at the relay unit and stops issuing a warning when the power receiving connector is connected to the power supply connector under a state where a weld failure occurs at the relay unit.

Preferably, the electric vehicle includes a cover that covers the power receiving connector. Furthermore, under a state in which a weld failure occurs at the relay unit and the power receiving connector is not covered by the cover, the warning unit issues a warning when the power receiving connector is not connected to the power supply connector and stops issuing a warning when the power receiving connector is connected to the power supply connector.

Preferably, the relay unit of the electric vehicle includes a first relay that is disposed at one of a pair of current carrying lines connecting the electric storage device and the power receiving connector and a second relay that is disposed at the other one of the pair of the current carrying lines. Furthermore, a lock mechanism is provided that fixes the cover at a position for covering the power receiving connector when a weld failure occurs at both of the first relay and the second relay, and releases the fixing of the cover when a weld failure occurs at either one of the first relay and the second relay.

Preferably and alternatively, the relay unit of the electric vehicle includes a first relay that is disposed at one of a pair of current carrying lines connecting the electric storage device and the power receiving connector and a second relay that is disposed at the other one of the pair of the current carrying lines. Furthermore, a warning that is issued from the warning unit when a weld failure occurs at both of the first relay and the second relay is different from a warning that is issued from the warning unit when a weld failure occurs at either one of the first relay and the second relay.

Preferably, the electric vehicle has a second warning unit that issues a warning when a weld failure occurs at the relay unit.

According to the present invention, under a state in which a weld failure occurs at the relay unit, the warning unit issues a warning when the power receiving connector is not connected to the power supply connector under a state where a weld failure occurs at the relay unit and stops issuing a warning when the power receiving connector is connected to the power supply connector under a state where a weld failure occurs at the relay unit. In other words, a warning is stopped under a state in which the power receiving connector is covered with the power supply connector, since an operator does not come in contact with the power receiving connector and thus safety is ensured. By stopping an excessive warning under a safe condition in this manner, it is possible to properly issue a warning to the operator without giving discomfort. Furthermore, stopping an excessive warning under a safe condition prevents the operator from erroneously recognizing a new warning issued due to the occurrence of another failure as the warning issued due to the weld failure, thereby allowing the operator to appropriately deal with the another failure.

DESCRIPTION OF THE PREFERRED EMBODIMENTS

Figure 1:
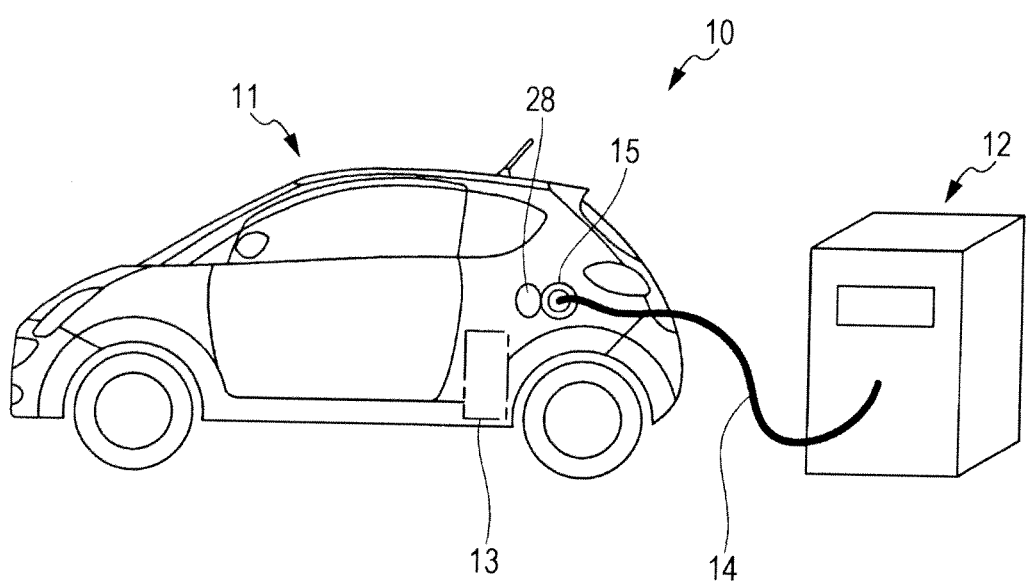
FIG. 1 is an explanatory diagram showing a case in which charging is preformed with an electric charging system according to an embodiment of the present invention.
Figure 2:
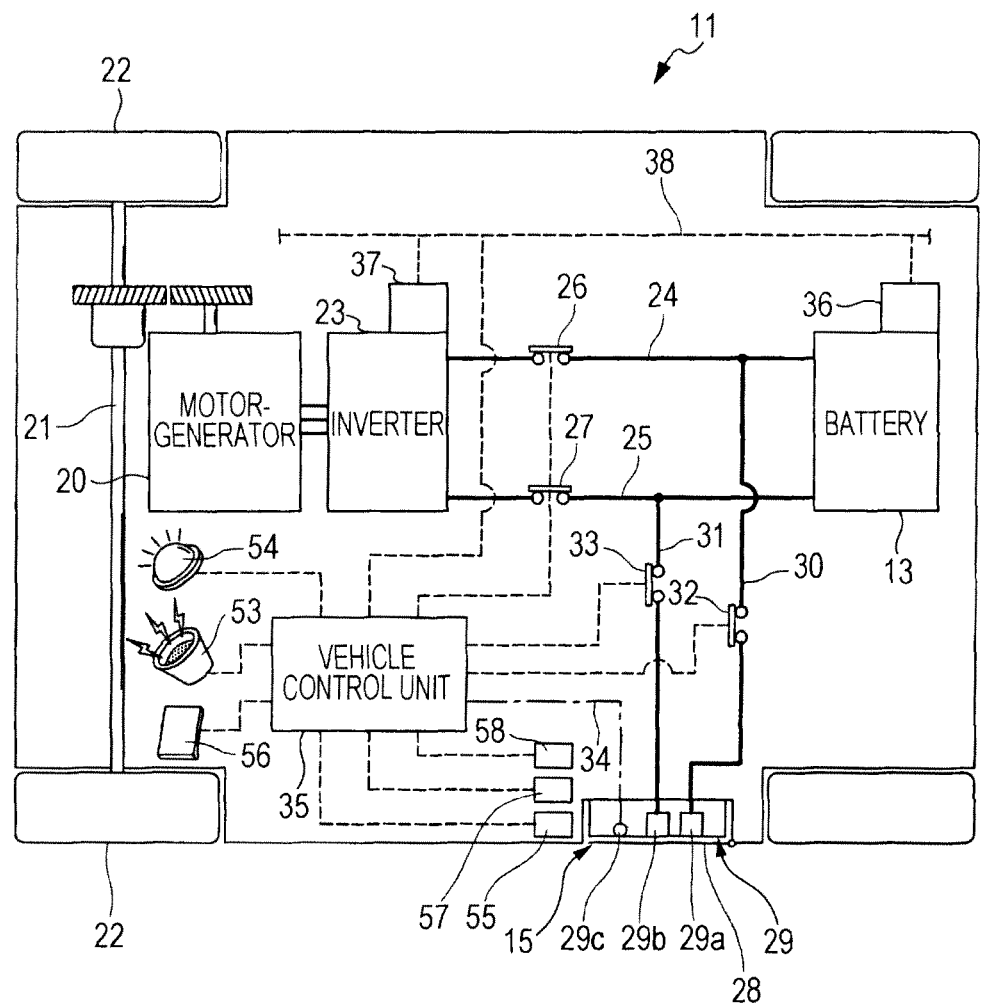
FIG. 2 is a schematic diagram showing an internal structure of an electric vehicle constituting the electric charging system.
Figure 3:
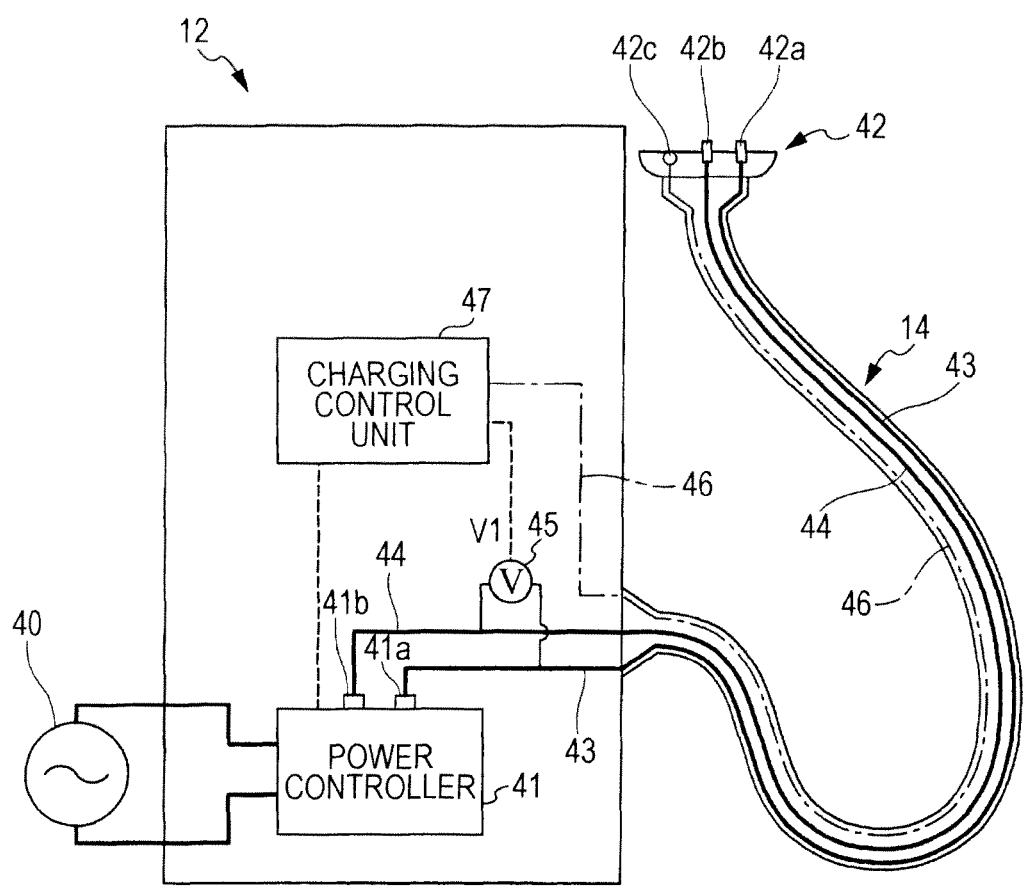
FIG. 3 is a schematic diagram showing an internal structure of an electric charger constituting the electric charging system.

An embodiment of the present invention will hereunder be described with reference to the drawings. FIG. 1 is an explanatory diagram showing a case in which charging is preformed with an electric charging system 10 according to an embodiment of the present invention. FIG. 2 is a schematic diagram showing an internal structure of an electric vehicle 11 constituting the electric charging system 10. FIG. 3 is a schematic diagram showing an internal structure of an electric charger 12 constituting the electric charging system 10. As shown in FIG. 1, the electric vehicle 11 according to the embodiment of the present invention is equipped with a battery 13 as an electric storage device. When the battery 13 is charged, a charging cable 14 of the electric charger 12 is connected to a charging port 15 of the electric vehicle 11.

As shown in FIG. 2, the electric vehicle 11 includes a motor-generator 20 for propulsion that is connected to drive wheels 22 via a drive axle 21. The motor-generator 20 is connected to the battery 13 via an inverter 23 that bidirectionally converts DC power and AC power. The battery 13 and the inverter 23 are connected by electric power lines 24 and 25. The electric power lines 24 and 25 have main relays 26 and 27 respectively. The charging port 15 of the electric vehicle 11 includes a charging lid (cover) 28 that is openably and closably disposed at a side of the vehicle body and a power receiving connector 29 that is housed inside the charging lid 28. The power receiving connector 29 has a pair of power receiving terminals 29a and 29b. The power receiving terminal 29a is connected to the electric power line 24 at a side of a positive electrode, via a power receiving line (current carrying line) 30. The power receiving terminal 29b is connected to the electric power line 25 at a side of a negative electrode, via a power receiving line (current carrying line) 31. The power receiving line 30 has a first relay (relay unit) 32, while the power receiving line 31 has a second relay (relay unit) 33. The power receiving connector 29 has a signal receiving terminal 29c, and the signal terminal 29c is connected to a communication line 34. The electric vehicle 11 includes a vehicle control unit 35 that integrally controls the entire vehicle, a battery control unit 36 that controls the battery 13, and a motor control unit 37 that controls the inverter 23. The control units 35 to 37 are connected to each other via a communication network 38. Each of the control units 35 to 37 is equipped with a CPU, a memory and the like.

As shown in FIG. 3, the electric charger 12 has a power controller 41 that converts AC power from an external power source 40 to DC power (charging power). The power controller 41 includes a rectifier circuit, an electric transformer, a switching circuit and the like. An end of the charging cable 14 of the electric charger 12 is provided with a power supply connector 42 that is attachable and detachable with respect to the power receiving connector 29. The power supply connector 42 has a pair of power supply terminals 42a ant 42b that correspond to the power receiving terminals 29a and 29b of the power receiving connector 29. The power supply terminal 42a is connected to a positive electrode terminal 41a of the power controller 41 via a power supply line 43, while the power supply terminal 42b is connected to a negative electrode terminal 41b of the power controller 41 via a power supply line 44. The electric charger 12 has a voltage sensor 45 that detects a voltage V1 between the power supply lines 43 and 44. The power supply connector 42 has a signal terminal 42c that is connected to a communication line 46. The electric charger 12 includes a charging control unit 47 that is equipped with a CPU, a memory and the like. The charging control unit 47 controls the power controller 41.

Figure 4:
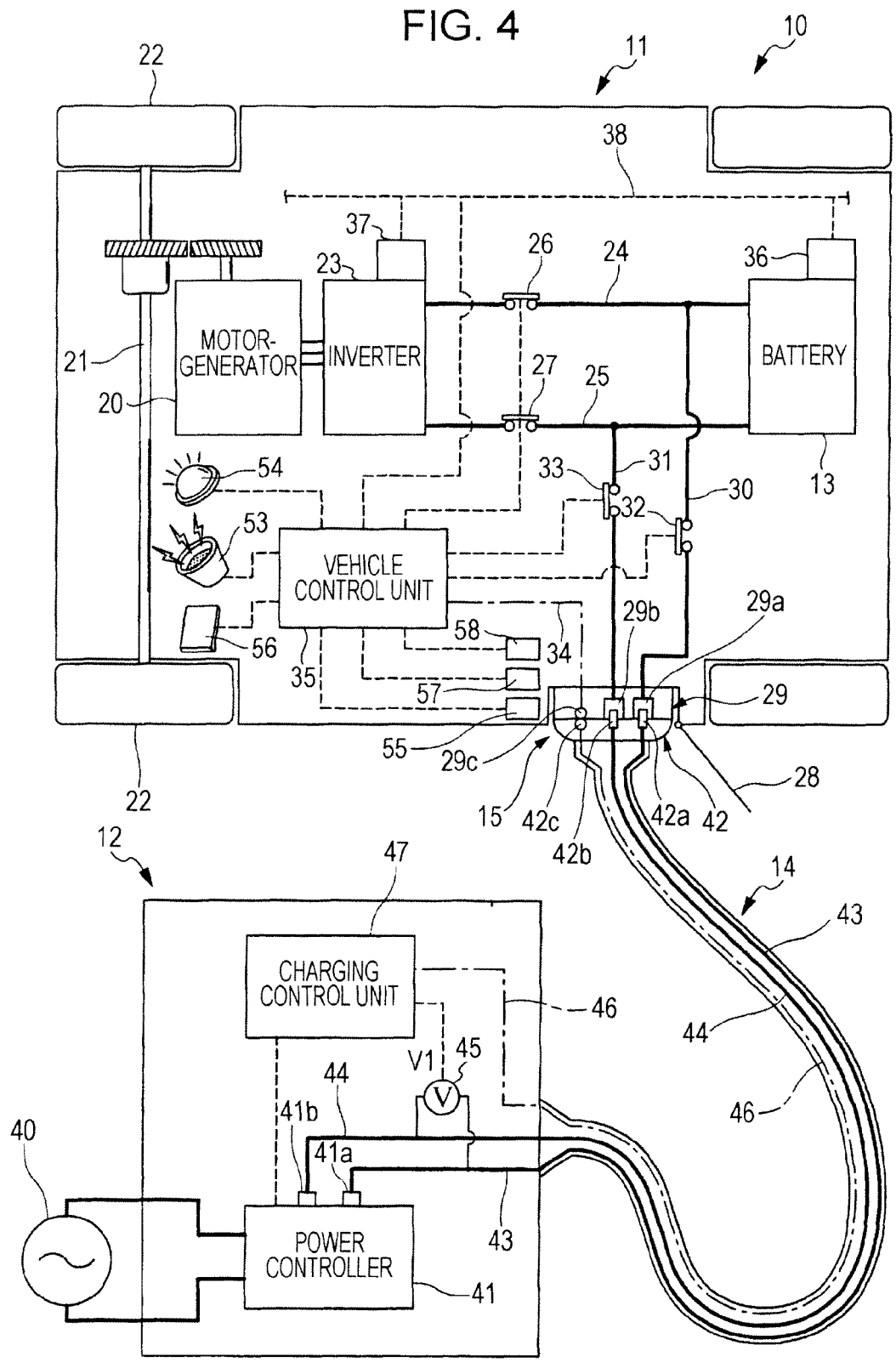
FIG. 4 is a schematic diagram showing a state where the electric charger is connected to the electric vehicle.

FIG. 4 is a schematic diagram showing a state where the electric charger 12 is connected to the electric vehicle 11. As shown in FIG. 4, when the charging cable 14 is connected to the charging port 15, the power receiving connector 29 is exposed by opening the charging lid 28 disposed at the vehicle body, and the power supply connector 42 of the charging cable 14 is connected to the power receiving connector 29. Accordingly, the power controller 41 is connected to the battery 13 via the power supply lines 43 and 44 and the power receiving lines 30 and 31, and the vehicle control unit 35 is connected to the charging control unit 47 via the communication lines 34 and 46. Then the charging control unit 47 sets a target voltage (for example, 400 V) corresponding to a target state of charge (SOC) of the battery 13 (for example, 100%) and supplies charging power from the power controller 41 to the battery 13 until the terminal voltage of the battery 14 reaches to the target voltage. Upon charging in which the electric charger 12 is connected to the electric vehicle 11, the voltage V1 between the power supply lines 43 and 44, which is the terminal voltage of the battery 13, can be measured with the voltage sensor 45 of the electric charger 12.

As described above, when the electric charger 12 is connected to the electric vehicle 11, it is necessary to expose the power receiving connector 29 to the outside by opening the charging lid 28 which covers it. Accordingly, when the electric charger 12 is connected to the electric vehicle 11, the power receiving terminals 29a and 29b connected to the battery 13 are temporarily exposed. Thus, the power receiving lines 30 and 31 have the relays 32 and 33 which are switched between a connection state and a disconnection state. Under a state where the power receiving terminal 29a and 29b are exposed due to opening of the charging lid 28, the relays 32 and 32, which are also called contactors, are switched to the disconnection state in which current conduction is blocked. Therefore, the power receiving terminals 29a and 29b are not exposed with a high voltage being applied thereto, whereby safety is ensured upon a charging operation. Since a large current is passed through the power receiving lines 30 and 31 during charging, a weld failure or a fusion failure may occur at the relays 32 and 33 of the power receiving lines 30 and 31. Thus, after the battery 13 is charged, the vehicle control unit 35 performs a relay diagnosis control to detect whether or not a weld failure or a fusion failure has occurred. The relay diagnosis control will be hereunder explained in detail.

Figure 5:
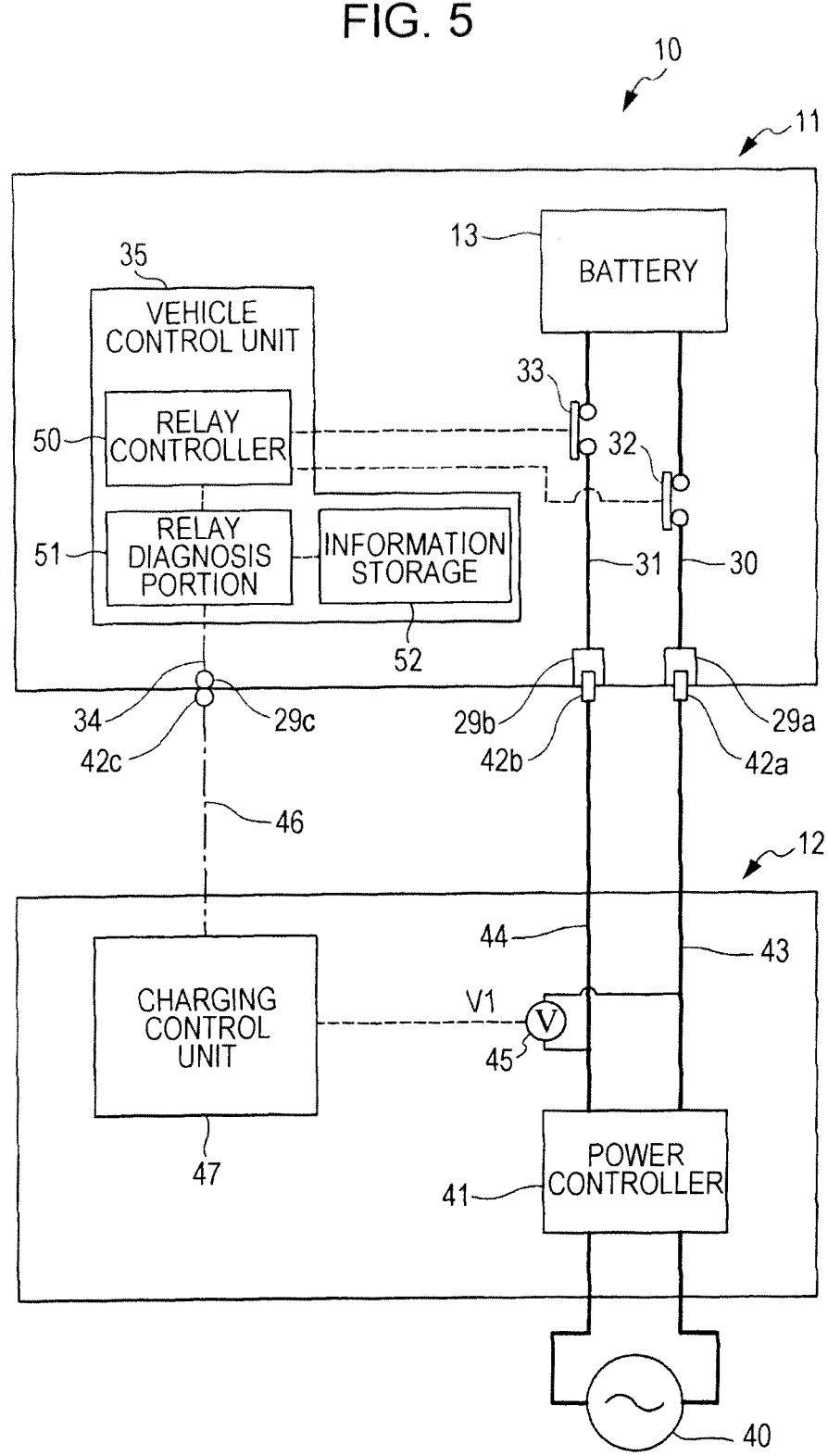
FIG. 5 is a schematic diagram showing main parts in the electric charging system that execute a relay diagnosis control.

FIG. 5 is a schematic diagram showing main parts in the electric charging system 10 that execute the relay diagnosis control. In FIG. 5, components that are identical to components shown in FIG. 4 are denoted by like reference numerals, and descriptions thereof are omitted. As shown in FIG. 5, the vehicle control unit 35 has a relay controller 50 that controls the operation state of the relays 32 and 33. The relay controller 50 controls current conduction to an unillustrated magnet coil of the relays 32 and 33, and switches the relays 32 and 33 between the connection state and the disconnection state. The vehicle control unit 35 further has a relay diagnosis portion 51 that detects an occurrence of a weld failure and a fusion failure in the relays 32 and 33. The relay diagnosis portion 51 receives control states of the relays 32 and 33 from the relay controller 50 as well as the voltage V1 from the electric charger 12 via the communication lines 34 and 46. The relay diagnosis portion 51 checks for a weld failure and a fusion failure in the relays 32 and 33 based on a change in the voltage V1 due to the switching of the relays 32 and 33. The vehicle control unit 35 further includes an information storage (information storage unit) 52. When a weld failure or fusion failure is determined to occur, information on the weld failure or fusion failure is stored in the information storage 52.

Figure 6:
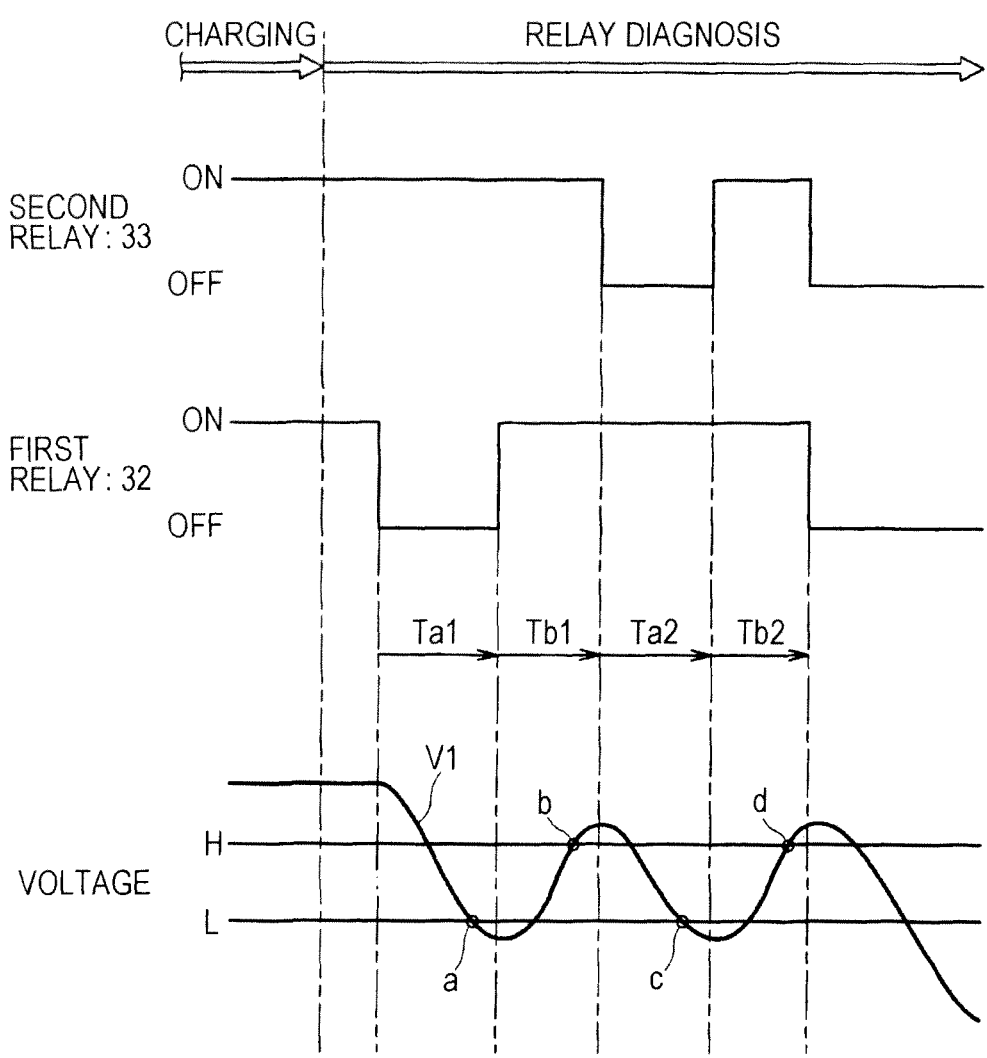
FIG. 6 is an explanatory diagram showing execution steps of the relay diagnosis control.

FIG. 6 is an explanatory diagram showing execution steps of the relay diagnosis control. As shown in FIG. 6, when charging of the battery 13 is complete, the first relay 32 is switched to the disconnection state (OFF) while the second relay 33 is kept in the connection state (ON). Then it is determined whether or not the voltage V1 falls below a predetermined determination voltage L (for example, 270 V) within a predetermined period of time Ta1 (for example, one second) in which the first relay 32 is disconnected. When the voltage V1 falls below the determination voltage L within the predetermined period of time Ta1 (reference numeral a), that is, when a voltage drop between the power receiving terminals 29a and 29b is confirmed with the disconnection of the first relay 32, it is determined that no weld failure occurs at the first relay 32. On the other hand, when the voltage V1 does not fall below the determination voltage L within the predetermined period of time Ta1, that is, when the predetermined voltage drop is not confirmed with the disconnection of the first relay 32, it is determined that a weld failure occurs at the first relay 32. If a weld failure is detected, information on the weld failure is stored in the information storage 52 of the vehicle control unit 35.

Then, the first relay 32 is switched to the connection state while the second relay 33 is kept in the connection state. It is determined whether or not the voltage V1 exceeds a predetermined determination voltage H (for example, 300 V) within a predetermined time Tb1 (for example, 0.5 seconds) in which the first relay 32 is connected. When the voltage V1 exceeds the determination voltage H in the predetermined period of time Tb1 (reference numeral b), that is, when a voltage rise between the power receiving terminals 29a and 29b is confirmed with the connection of the first relay 32, it is determined that no fusion failure occurs at the first relay 32. On the other hand, when the voltage V1 does not rise to the determination voltage H in the predetermined period of time Tb1, that is, when the predetermined voltage rise is not confirmed with the connection of the first relay 32, it is determined that a fusion failure occurs at the first relay 32. If a fusion failure is detected, information on the fusion failure is stored in the information storage 52 of the vehicle control unit 35.

Then, the second relay 33 is switched to the disconnection state while the first relay 32 is kept in the connection state. It is determined whether or not the voltage V1 falls below the predetermined determination voltage L within a predetermined time Ta2 (for example, one second) in which the second relay 33 is disconnected. When the voltage V1 falls below the determination voltage L in the predetermined period of time Ta2 (reference numeral c), that is, when a voltage drop between the power receiving terminals 29a and 29b is confirmed with the disconnection of the second relay 33, it is determined that no weld failure occurs at the second relay 33. On the other hand, when the voltage V1 does not fall below the determination voltage L in the predetermined period of time Ta2, that is, when a predetermined voltage drop is not confirmed with the disconnection of the second relay 33, it is determined that a weld failure occurs at the second relay 33. If a weld failure is detected, information on the weld failure is stored in the information storage 52 of the vehicle control unit 35.

Then, the second relay 33 is switched to the connection state while the first relay 32 is kept in the connection state. Within a predetermined time Tb2 (for example, 0.5 seconds) in which the second relay 33 is connected, it is determined whether or not the voltage V1 exceeds the predetermined determination voltage H. When the voltage V1 exceeds the determination voltage H in the predetermined period of time Tb2 (reference numeral d), that is, when a voltage rise between the power receiving terminals 29a and 29b is confirmed with the connection of the second relay 33, it is determined that no fusion failure occurs at the second relay 33. On the other hand, when the voltage V1 does not rise to the determination voltage H in the predetermined period of time Tb2, that is, when the predetermined voltage rise is not confirmed with the connection of the second relay 33, it is determined that a fusion failure occurs at the second relay 33. If a fusion failure is detected, information on the fusion failure is stored in the information storage 52 of the vehicle control unit 35. In the above description, the determination voltage H in the relay diagnosis control is set to 300 V as an example. This is because the terminal voltage of the battery 13 becomes 300 V when the SOC is 0%. That is, regardless of the SOC of the battery 13, the terminal voltage of the battery 13 is kept at 300 V or higher. Accordingly, if the relays 32 and 33 are connected, a voltage of 300 V or higher is immediately detected by the voltage sensor 45. Thus, the determination voltage is set to 300 V which is the lower limit voltage. By setting the determination voltage to the lower limit voltage of the battery 13, it is possible to reliably detect a fusion failure at the relays 32 and 33 with a shorter time for determination. The determination voltage H is not limited to 300V, and a different value that is equal to or higher than the lower limit voltage of the battery 13 may be used. Furthermore, the determination voltage L in the relay diagnosis control is set to 270 V, but is not limited to this. A different value that is lower than the lower limit voltage of the battery 13 may be used.

As described above, when a weld failure occurs at the relay 32 and 33, a high voltage may be applied to the power receiving connector 29, and thus it is necessary to notify an operator such as a driver of a weld failure of the relay 32 and 33 in order to ensure safety during a charging operation. When a weld failure of the relay 32 and 33 is detected in the relay diagnosis control, the vehicle control unit 35 notifies the operator of the occurrence of the weld failure using a later-described warning buzzer 53 or the like. A failure notification control for notifying a weld failure will be hereunder described. The failure notification control is constantly executed regardless an operation state of an ignition switch that activates a vehicle system.

Figure 7:
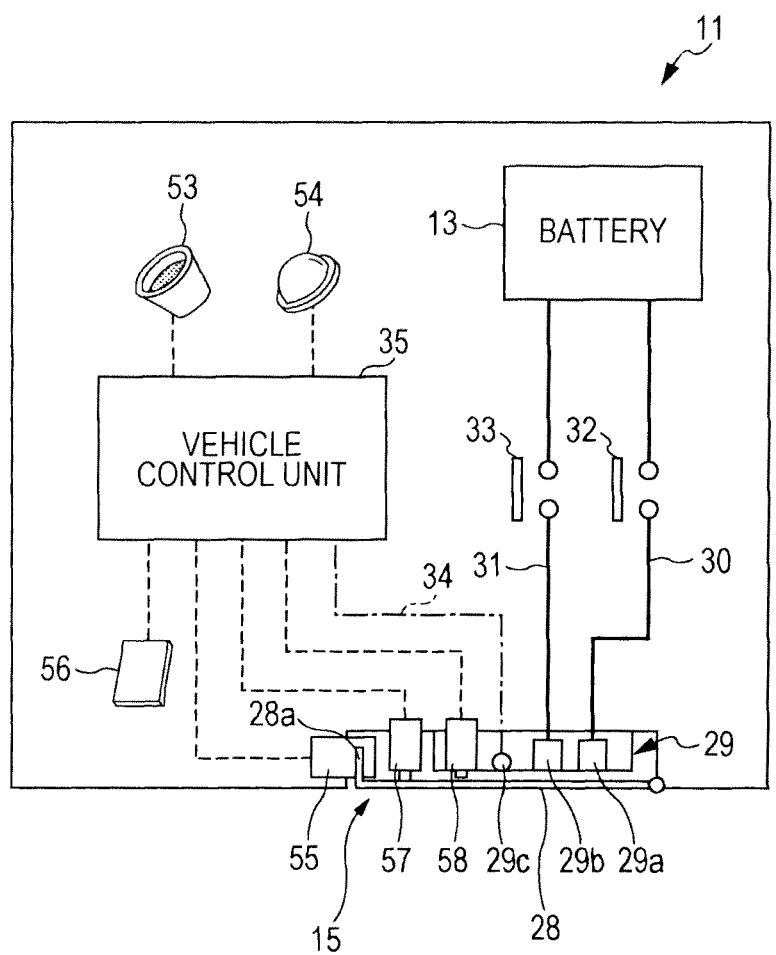
FIG. 7 is a schematic diagram showing main parts in the electric vehicle that execute a failure notification control.

FIG. 7 is a schematic diagram showing main parts in the electric vehicle 11 that execute the failure notification control. In FIG. 7, components that are identical to components shown in FIG. 2 are denoted by like reference numerals, and descriptions thereof are omitted. As shown in FIG. 7, the electric vehicle 11 has a warning buzzer (warning unit) 53 that issues a warning sound and a warning lamp (second warning unit) 54 that issues a warning light. The electric vehicle 11 also has a lock actuator (lock mechanism) 55 that fixes the charging lid 28 at a closing position shown in FIG. 7. The charging lid 28 has a striker 28a that is disposed so as to face the lock actuator 55. The lock actuator 55 has an unillustrated engaging hook that is engaged with the striker 28a. When the charging lid 28 is closed to the closing position, the engaging hook of the lock actuator 55 retains the striker 28a of the charging lid 28, and the charging lid 28 is fixed at the closing position. The electric vehicle 11 further has a lid opener 56 that is operated upon opening the charging lid 28. When an operator operates the lid opener 56, a releasing signal is sent to the lock actuator 55 via the vehicle control unit 35, and the lock actuator 55 actuates the engaging hook to a retreated position to release the striker 28a of the charging lid 28. In this manner, the actuator 55 performs the releasing operation based on the operation of the lid opener 56, whereby the charging lid 28 can be opened. The electric vehicle 11 further has a lid sensor 57 that detects an opening/closing state of the charging lid 28 and a connector sensor (connection detection unit) 58 that detects a connection state between the power receiving connector 29 and the power supply connector 42.

Figure 8:
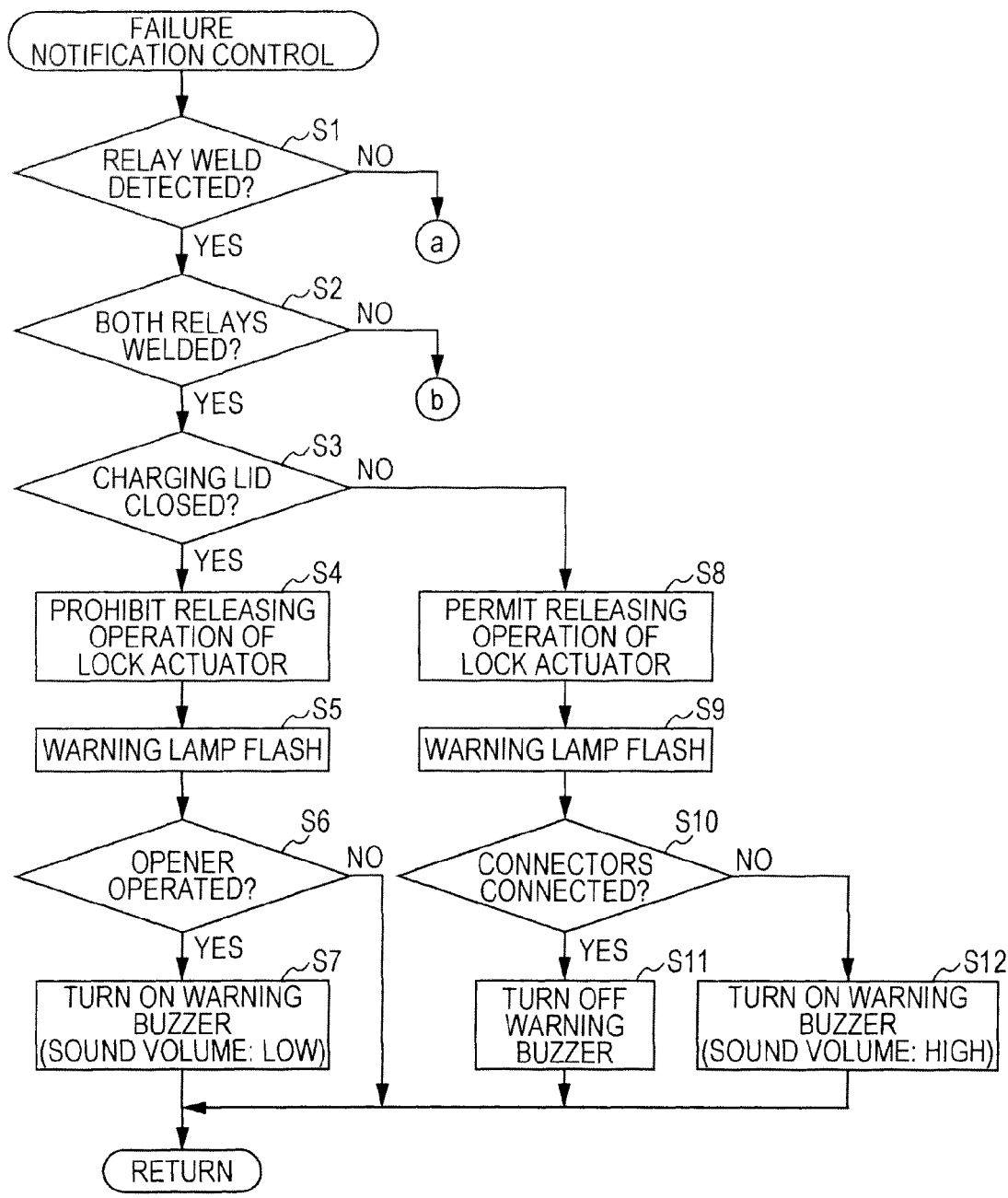
FIG. 8 is a flowchart exemplifying execution steps of the failure notification control.
Figure 9:
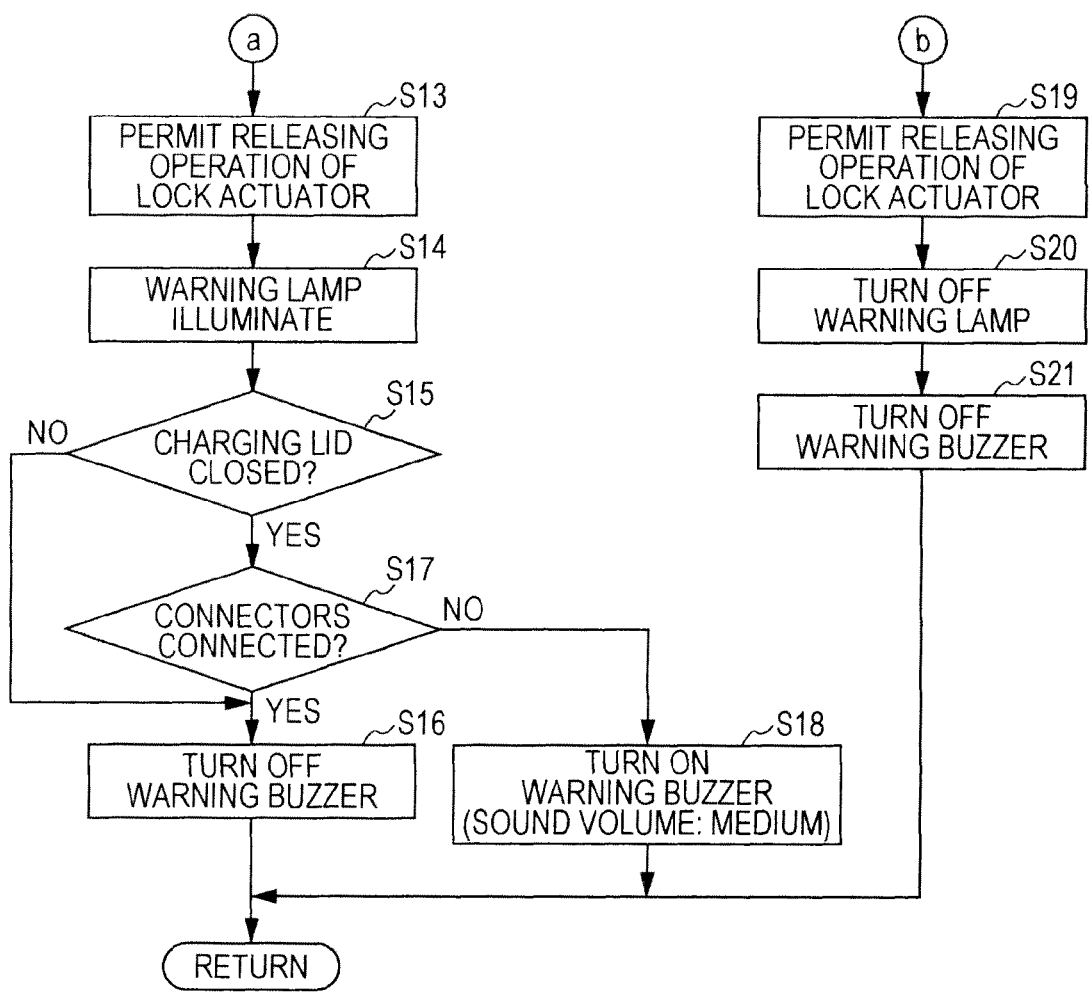
FIG. 9 is a flowchart exemplifying execution steps of the failure notification control.

Next, the execution steps of the failure notification control will be described. FIGS. 8 and 9 are flowcharts exemplifying execution steps of the failure notification control. The flow charts shown in FIGS. 8 and 9 are connected to each other at points of reference numerals a and b. As shown in FIG. 8, step S1 determines whether a weld failure occurs at either one of the relays 32 and 33, based on failure information stored in the information storage 52. When a weld failure is determined to occur in step S1, the flow proceeds to step S2 that determines whether or not the weld failure occurs at both of the relays 32 and 33. When the weld failure is determined to occur at both of the relays 32 and 33 in step S2, the flow proceeds to step S3. Based on an output signal from the lid sensor 57, step S3 determines whether or not the charging lid 28 is closed. When the charging lid 28 is determined to be closed in step S3, the flow proceeds to step S4 that prohibits the releasing operation of the lock actuator 55. In following step S5, the warning lamp flashes. Following step S6 determines whether or not the lid opener 55 is operated. When in step S6 the lid opener 56 is determined to be operated, the flow proceeds to step S7 where the releasing operation of the lock actuator 56 is not performed and the warning buzzer 52 issues a low-volume sound for a short period of time. When in step S6 the lid opener 56 is determined not to be operated, on the other hand, the flow exits the routine without a warning sound being issued. In this manner, when both of the relays 32 and 33 are welded, that is, when a high voltage is applied to the power receiving connector 29, the warning lamp 54 flashes to notify the operator of the risk while the releasing operation of the lock actuator 55 is prohibited and the charging lid 28 is fixed at the closing position so as not to allow the power receiving connector 29 to be exposed. Furthermore, when the lid opener 56 is operated to open the charging lid 28, the operator is notified of the risk by issuing a warning sound from the warning buzzer 53 in addition to by flashing of the warning lamp 54. The warning buzzer 53 may issue a warning sound when an attempt is made to force open the charging lid 28 in addition to when the lid opener 56 is operated.

When in step S3 the charging lid 28 is determined to be open, the flow proceeds to step S8 where the releasing operation of the lock actuator 55 is permitted. In following step S9, the warning lamp 54 flashes. Following step S10 determines whether the power receiving connector 29 is connected to the power supply connector 42. When in step S10 the power receiving connector 29 is determined to be connected to the power supply connector 42 in step S10, the flow proceeds to step S11 that turns off the warning buzzer 53. When in step S10 the power receiving connector 29 is determined not to be connected to the power supply connector 42, the flow proceeds to step S12 where the warning buzzer 53 issues a high-volume sound. In this manner, when a high voltage is applied to the power receiving connector 29 due to the weld failure of the relays 32 and 33 but the charging lid 28 is opened, the warning lamp flashes to alert the operator and the connection state between the power receiving connector 29 and the power supply connector 42 is examined. When the power receiving connector 29 is not connected to the power supply connector 42, that is, when the power receiving connector 29 to which a high voltage is applied is exposed, the warning buzzer 53 issues a high-volume sound to notify the operator of the risk. When the power receiving connector 29 is connected to the power supply connector 42, that is, when the power receiving connector 29 to which a high voltage is applied is not exposed, the warning buzzer 53 stops outputting the warning sound since the operator is unlikely to come in contact with the power receiving connector 29.

When in step S2 a weld failure is determined to occur at only either one of the relays 32 and 33, the flow proceeds to step S13 that permits the releasing operation of the lock actuator 55. In following step S14, the warning lamp 54 illuminates. Following step S15 determines whether or not the charging lid 28 is opened. When the charging lid 28 is determined to be closed, the flow proceeds to step S16 that turns off the warning buzzer 53. When in step S15 the charging lid 28 is determined to be opened, the flow proceeds to step S17 that determines whether or not the power receiving connector 29 is connected to the power supply connector 42. When in step S17 the power receiving connector 29 is determined to be connected to the power supply connector 42, the flow proceeds to step S16 that turns off the warning buzzer 53. When in step S17 the power receiving connector 29 is determined not to be connected to the power supply connector 42, the flow proceed to step where the warning buzzer 53 issues a medium-volume sound. In this manner, when only either one of the relays 32 and 33 is welded, that is, when a high voltage is currently not applied to the power receiving connector 29 but may be applied thereto afterwards, opening of the charging lid 28 is permitted while the warning lamp 54 flashes to alert the operator. When the charging lid 28 is opened by the operation of the lid opener 56, the connection state between the power receiving connector 29 and the power supply connector 42 is examined. When the power receiving connector 29 is not connected to the power supply connector 42, that is, when the power receiving connector 29 to which a high voltage may be applied is exposed, the warning buzzer 53 issues a medium-volume warning sound to notify the operator of the risk. On the other hand, when the power receiving connector 29 to which a high voltage may be applied is not exposed, the warning buzzer 53 stops outputting the warning sound since the operator is unlikely to come in contact with the power receiving connector 29.

When it is determined in step S1 that a weld failure occurs at neither of the relays 32 and 33, a high voltage is unlikely to be applied to the power receiving connector 29, and thus the flow proceeds to step S19 that permits the releasing operation of the lock actuator 55. The warning lamp is turned off in following step S20, and the warning buzzer 53 is turned off in step S21.

Figure 10:
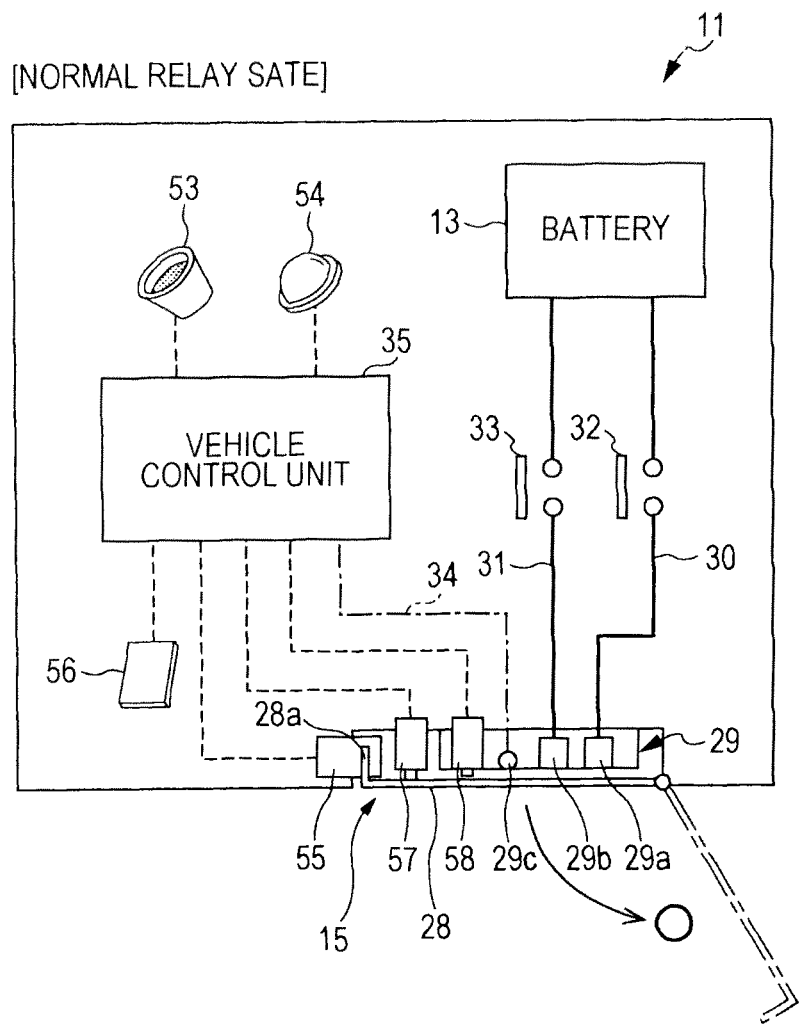
FIG. 10 is an explanatory diagram showing a state in which no weld failure occurs at relays.
Figure 11:
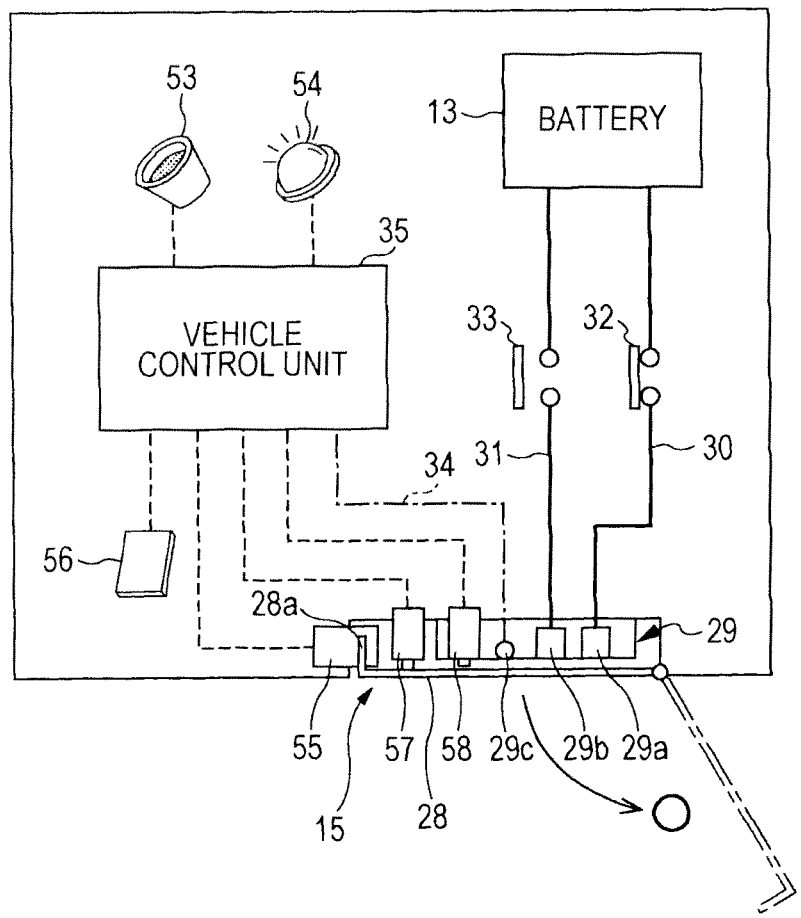
FIG. 11 is an explanatory diagram showing a state in which a weld failure occurs at either one of the relays.
Figure 12:
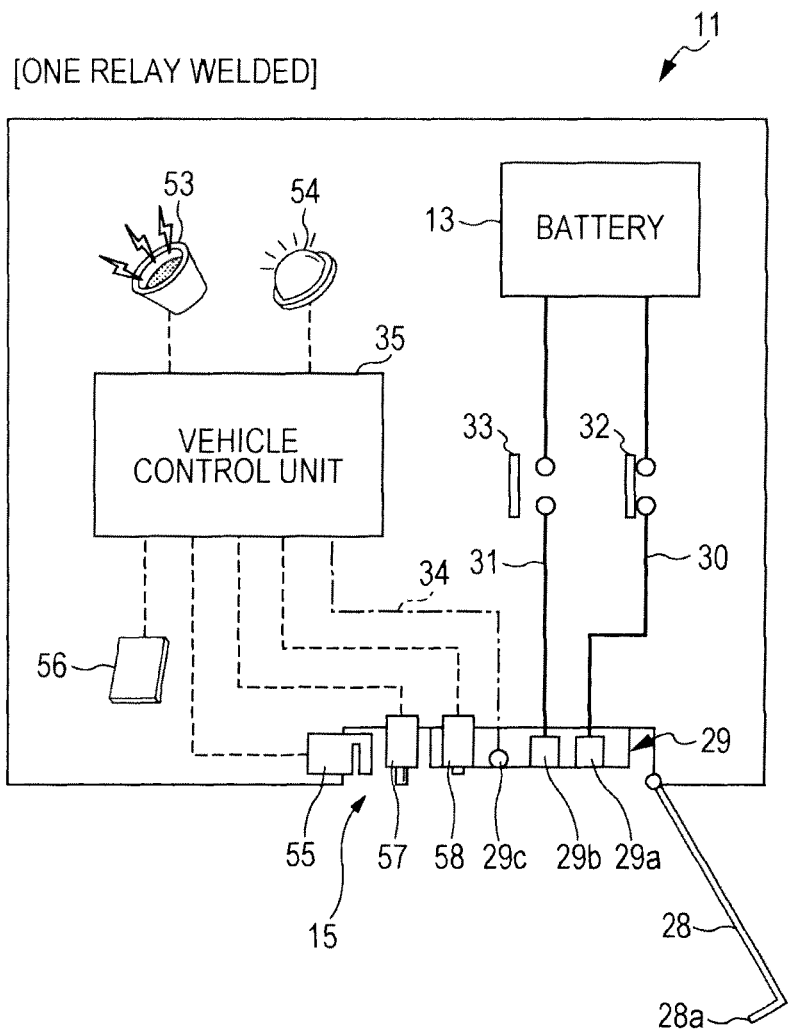
FIG. 12 is an explanatory diagram showing a state in which a weld failure occurs at either one of the relays.
Figure 13:
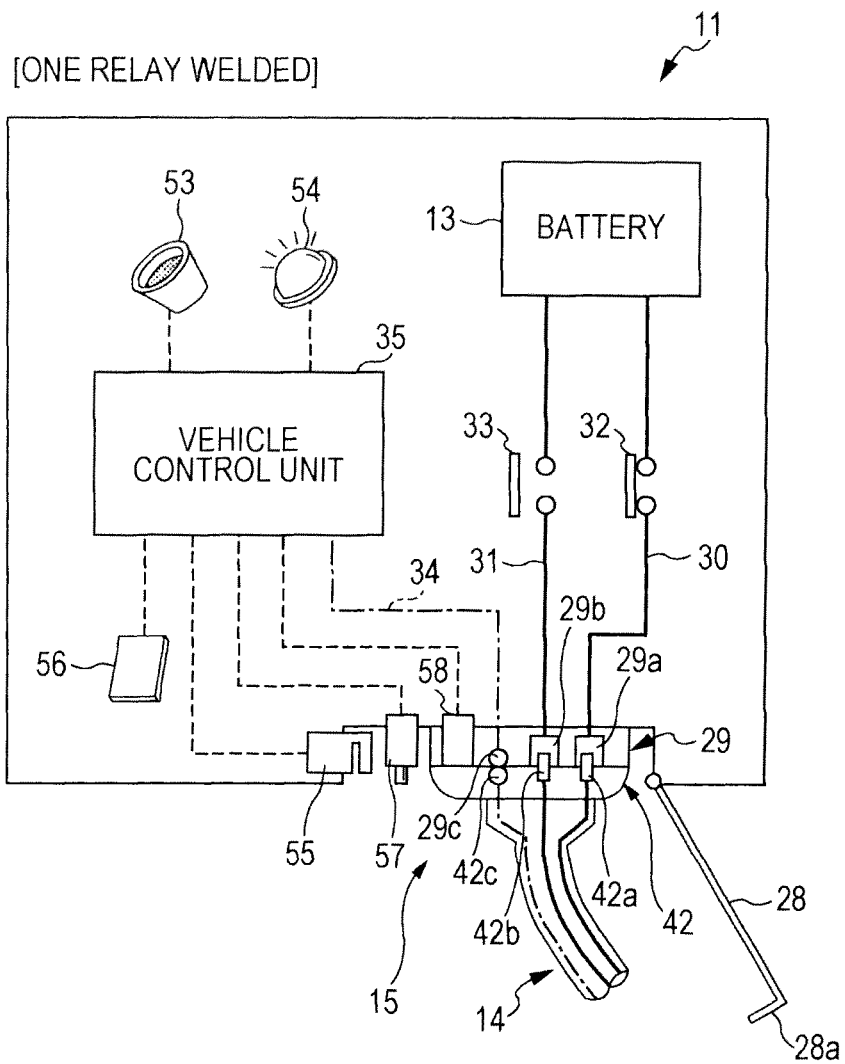
FIG. 13 is an explanatory diagram showing a state in which a weld failure occurs at either one of the relays.
Figure 14:
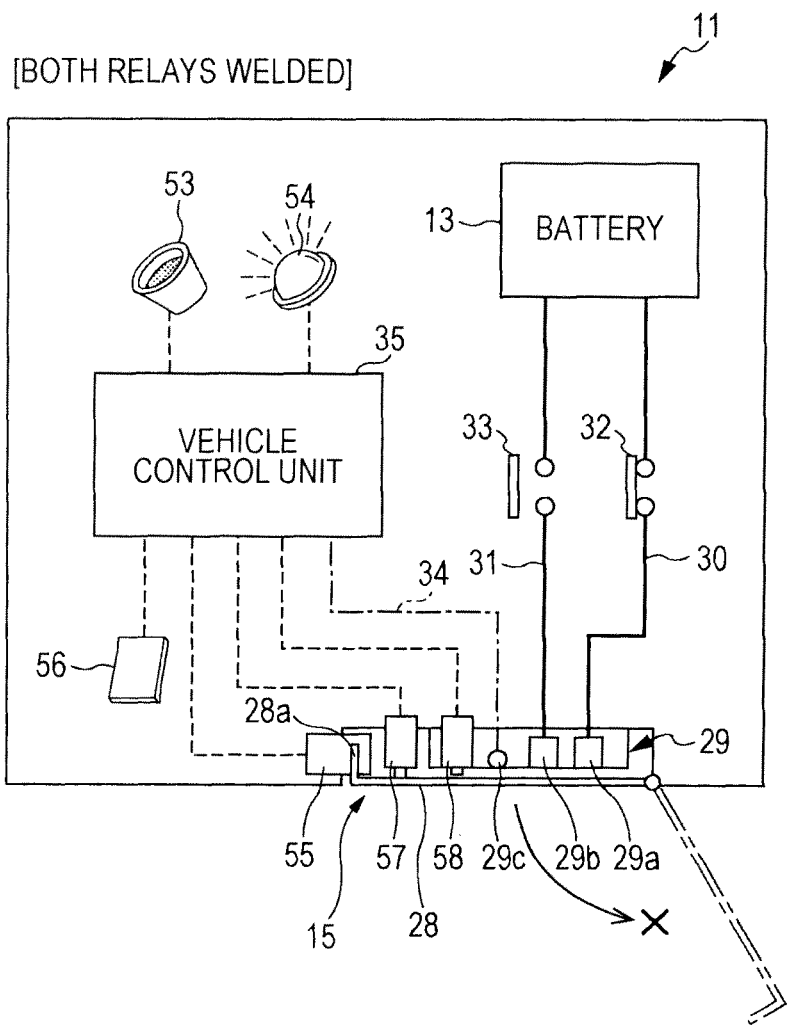
FIG. 14 is an explanatory diagram showing a state in which a weld failure occurs at both of the relays.
Figure 15:
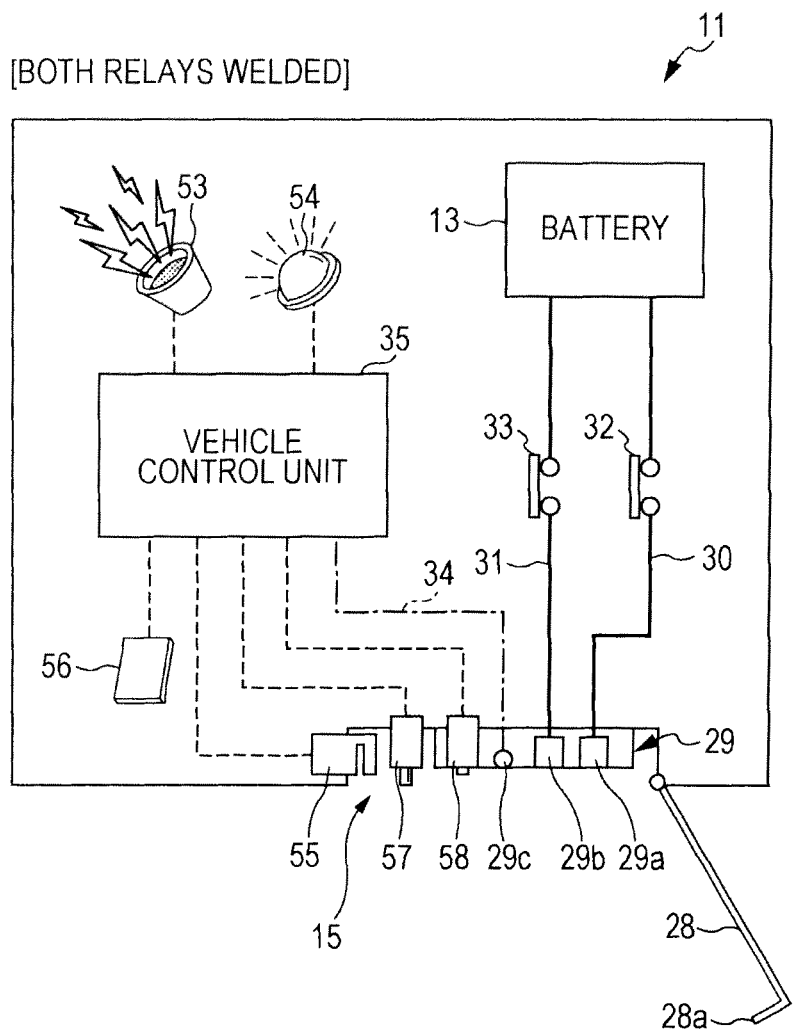
FIG. 15 is an explanatory diagram showing a state in which a weld failure occurs at both of the relays.
Figure 16:
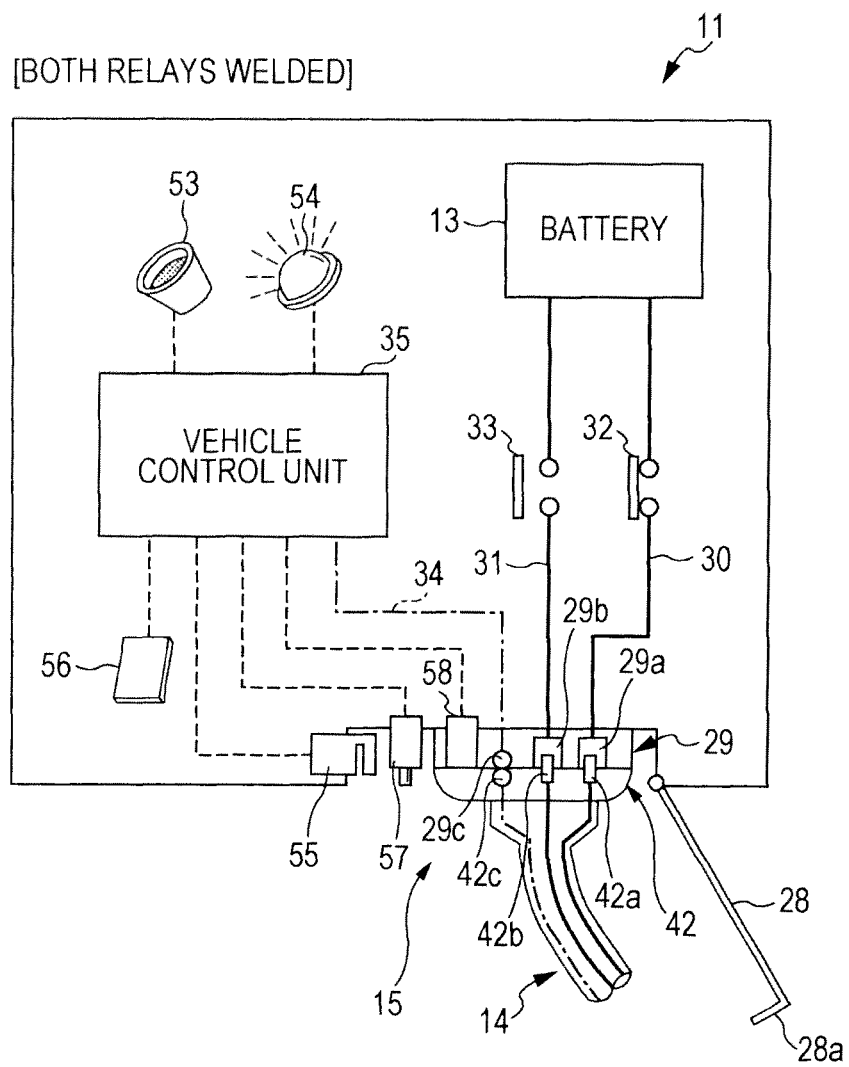
FIG. 16 is an explanatory diagram showing a state in which a weld failure occurs at both of the relays.

Next, the above-mentioned failure notification control will be explained with drawings. FIG. 10 is an explanatory diagram showing a state in which a weld failure occurs at neither one of the relays 32 and 33. FIGS. 11 to 13 are explanatory diagrams showing a state in which a weld failure occurs at the relay 32. FIGS. 14 to 16 are explanatory diagrams showing a state in which a weld failure occurs at both of the relays 32 and 33. In FIGS. 10 to 16, components that are identical to components shown in FIG. 7 are denoted by like reference numerals, and descriptions thereof are omitted. As shown in FIG. 10, when a weld failure occurs at neither one of the relay 32 and 33, a high voltage is unlikely to be applied to the power receiving connector 29, and thus the releasing operation of the lock actuator 55 is permitted. Then the warning lamp 54 and the warning buzzer 53 are turned off. In this case, the charging lid 28 can be opened by operating the lid opener 56, whereby the power receiving connector 29 can be connected to the power supply connector 42.

As shown in FIG. 11, when a weld failure occurs at the relay 32, the releasing operation of the lock actuator 55 is permitted while the warning lamp 54 illuminates to alert the operator. Under the state where a weld failure occurs at the relay 32, a high voltage will be immediately applied to the power receiving connector 29 if a weld failure also occurs at the relay 33. If charging is immediately prohibited under such a state, the usability of the electric vehicle 11 is significantly impaired. Thus, the releasing operation of the lock actuator 55 is permitted with the warning lamp 54 illuminating to alert the operator. As shown in FIG. 12, when the charging lid 28 is opened by the operation of the lid opener 56, the terminals of the power receiving connector 29 to which a high voltage may be applied are exposed. Thus the warning lamp 54 illuminates as well as the warning buzzer 53 issues a medium-volume warning sound. As shown in FIG. 13, when the power receiving connector 29 is connected to the power supply connector 42, the terminals of the power receiving connector 29 are covered by the power supply connector 42. Thus, while the warning lamp 54 remains illuminating, the warning buzzer 53 is turned off. In this manner, when a weld failure occurs at the relay 32 but the power receiving connector 29 is connected to the power supply connector 42, the warning buzzer 53 stops issuing a warning sound. That is, under a state where safety is ensured, the warning buzzer 53 is turned off to prevent an excessive warning. In so doing, it is possible to notify the operator of the risk without giving discomfort. Furthermore, since the warning buzzer 53 is turned off under a state where safety is ensured, the operator does not erroneously recognize a new warning that is issued from a charger or the like due to another failure as a warning due to the weld failure and can appropriately deal with the another failure. While FIGS. 11 to 13 show a state where a weld failure occurs at the relay 32, the same failure notification control is executed also when a weld failure occurs only at the relay 33.

As shown in FIG. 14, when a weld failure occurs at both of the relays 32 and 33, a high voltage is already applied to the power receiving connector 29. Thus, the warning lamp 54 flashes to notify the operator of the risk, and the releasing operation of the lock actuator 55 is prohibited. As mentioned earlier, when the releasing operation of the lock actuator 55 is prohibited but the lid opener 56 is operated, the warning buzzer 53 issues a warning sound to notify the operator of the risk. Furthermore, as shown in FIG. 15, when a weld failure occurs at both of the relays 32 and 33 and the charging lid 28 is opened, the power receiving connector 29 to which a high voltage is applied is exposed. Thus, the warning lamp 54 flashes as well as the warning buzzer 53 issues a high-volume sound. Then, as shown in FIG. 16, when the power receiving connector 29 is connected to the power supply connector 42, the terminals of the power receiving connector 29 are covered by the power supply connector 12. Thus, while the warning lamp 54 remains flashing, the warning buzzer 53 is turned off. In this manner, when a weld failure occurs at both of the relays 32 and 33, but the power receiving connector 29 is connected to the power supply connector 42, the warning buzzer 53 stops issuing a warning sound. That is, under a state where safety is ensured, the warning buzzer 53 is turned off to prevent an excessive warning. In so doing, it is possible to notify the operator of the risk without giving discomfort. Furthermore, since the warning buzzer 53 is turned off under a state where safety is ensured, the operator does not erroneously recognize a new warning that is issued from a charger or the like due to another failure as a warning due to the weld failure and can appropriately deal with the another failure.

As described above, the warning buzzer 53 issues a warning sound when the power receiving connector 29 is not connected to the power supply connector 42 under a state where a weld failure occurs at both of the relays 32 and 33, and stops issuing a warning sound when the power receiving connector 29 is connected to the power supply connector 42 under a state where a weld failure occurs at both of the relays 32 and 33. Specifically, when the power receiving connector 29 to which a high voltage may be applied is covered by the power supply connector 42, safety is ensured and thus the warning buzzer 53 stops issuing a warning sound to prevent an excessive warning. As a result, it is possible to properly issue a warning to the operator without giving discomfort.

Furthermore, when a weld failure occurs at both of the relays 32 and 33, the releasing operation of the lock actuator 55 is prohibited. Thus, the power receiving connector 29 to which a high voltage is applied is not exposed, whereby it is possible to enhance safety of the electric charging system 10 and the electric vehicle 11. When a weld failure occurs at either one of the relays 32 and 33, the releasing operation of the lock actuator 55 is permitted, whereby it is possible to open the charging lid 28 to charge the battery 13. In so doing, even when electric power of the battery 13 is exhausted under a state where a weld failure occurs at either one of the relays 32 and 33 and, it is possible to charge the battery 13 and drive the electric vehicle 11 to a maintenance shop or the like, thereby improving the usability of the electric vehicle 11.

The volume of the warning sound which is issued by the warning buzzer 53 when both of the relays 32 and 33 are welded is set higher than the volume of the warning sound which is issued by the warning buzzer 53 when either one of the relays 32 and 33 is welded. Furthermore, the warning lamp 54 enters the illuminating state when either one of the relays 32 and 33 is welded and enters the flashing state, which is more conspicuous than the illuminating state, when both of the relays 32 and 33 are welded. By changing the warning depending on the level of a risk occurring in this manner, it is possible to properly notify the operator of the risk. While in the above description the warning sound issued by the warning buzzer 53 is changed in volume, the present invention is not limited to this. Alternatively, the warning sound issued by the warning buzzer 53 may be changed in rhythm, tone, melody or the like. Furthermore, while in the above description the warning lamp 54 illuminates or flashes, but the present invention is not limited to this. Alternatively, the light emitted from the warning lamp 54 may be changed in intensity, color, flashing interval or the like.

Figure 17:
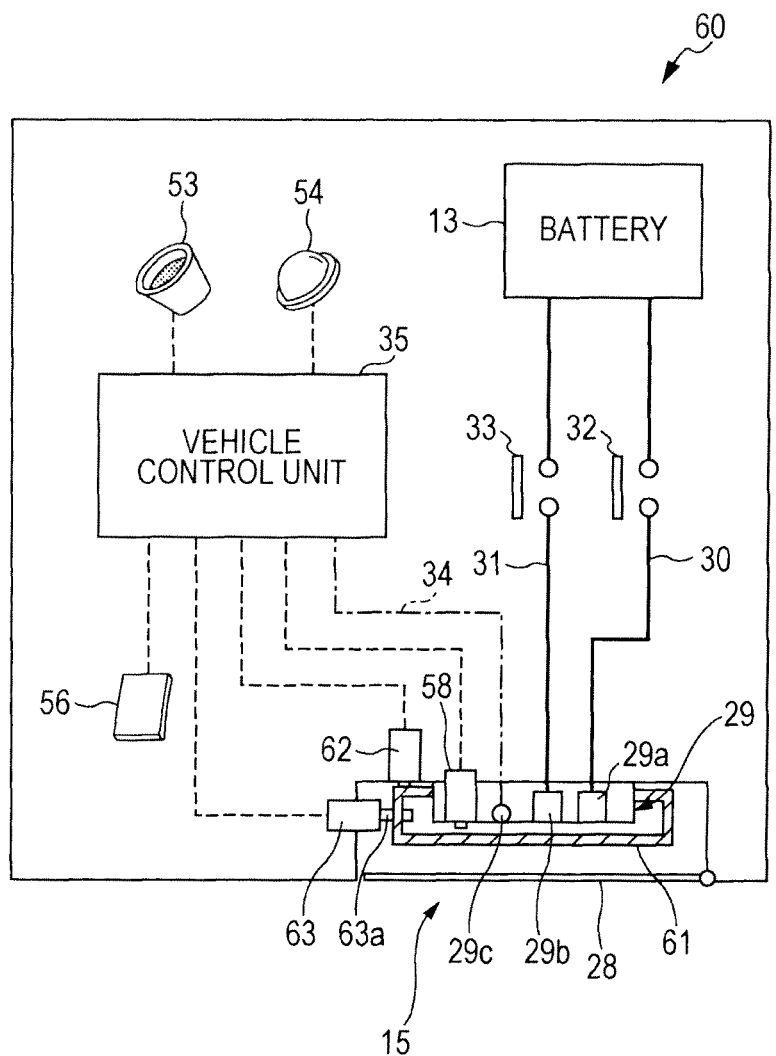
FIG. 17 is a schematic diagram exemplifying a configuration of an electric vehicle according to another embodiment of the present invention.

While the above description uses the charging lid 28 which is openably and closably disposed at the body of the electric vehicle 11 as the cover, the present invention is not limited to this. Alternatively, a connector cap 61 that is detachably disposed at the power receiving connector may be used as the cover. FIG. 17 is a schematic diagram exemplifying a configuration of an electric vehicle 60 according to another embodiment of the present invention. In FIG. 17, components that are identical to components shown in FIG. 7 are denoted by like reference numerals, and descriptions thereof are omitted. As shown in FIG. 17, the connector cap (cover) 61 is detachably attached to the power receiving connector 29 housed within the charging lid 28. Upon charging, the power receiving connector 29 of the electric vehicle 11 is exposed by opening the charging lid 28 and afterwards detaching the connector cap 61. The electric vehicle 11 further has a cap sensor 62 that detects the mounted state of the cap connector 61.

The electric vehicle 11 further has a lock actuator (lock mechanism) 63 that fixes the connector cap 61 at a mounting position shown in FIG. 17. The lock actuator 63 has a retractable lock pin 63a. The lock pin 63a moves to a projecting position and a retreated position according to a control signal from the vehicle control unit 35. Projecting the lock pin 63a towards the connector cap 63a allows the connector cap 61 to be fixed at the mounting position. By retreating the lock pin 63a from the connector cap 61, it is possible to release the fixing of the connector cap 61, whereby the connector cap 61 can be detached.

In this manner, a similar effect to that of the previous embodiment can be obtained when the connector cap 61 of the power receiving connector 29 is used as the cover. Specifically, the above-mentioned failure notification control is executed under the condition where the closed state of the charging lid 28 is replaced by the mounted state of the connector cap 61 as well as the opened state of the charging lid 28 is replaced by the detached state of the connector cap 61, whereby a similar effect to that of the Previous embodiment can be obtained. While the above description projects the lock pin 63a from the lock actuator 63 to fix the connector cap 61, the present invention is not limited to this configuration. The connector cap 61 may be fixed at the mounting position by another component.

The present invention is not limited to the above-described embodiments. It will be apparent to those skilled in the art that various changes may be made without departing from the scope of the invention. While in the above description the vehicle control unit 35 includes the relay diagnosis portion 51 and the information storage 52, the present invention is not limited to this. Alternatively, the charging control unit 47 of the electric charger 12 may include the relay diagnosis portion 51 and the information storage 52. Furthermore, while in the above description the voltage sensor 45 is provided in the electric charger 12 to measure the voltage between the power supply lines 43 and 44, the present invention is not limited to this. Alternatively, a voltage sensor may be provided in the electric vehicle 11 to measure a voltage between the power receiving lines 30 and 31. Furthermore, while the above description uses the warning buzzer 53 as the warning unit and the warning lamp 54 as the second warning unit, the present limitation is not limited to this. Alternatively, the warning lamp 54 may be used as the warning unit and the warning buzzer 53 may be used as the second warning unit. Further alternatively, a display may be uses as the warning unit and the second warning unit. The warning buzzer 53 and the warning lamp 54 are preferably disposed in the vicinity of the charging port 15.

While the above description uses the connector sensor as the connection detection unit to detect the connection state between the power receiving connector 29 and the power supply connector 42, the present limitation is not limited to this. Alternatively, the connection state between the power receiving connector 29 and the power supply connector 42 may be detected by another method. For example, since connecting the power receiving connector 29 and the power supply connector 42 makes the vehicle control unit 35 connected to the charging control unit 47 via the communication lines 34 and 46, it is possible to detect the connection state between the connectors 29 and 42 based on the communication state between the control units 35 and 47. In this manner, by making the vehicle control unit 35 and the charging control unit 47 as the connection detection unit, the connection state between the connectors 29 and 42 may be detected without using the connector sensor 58. Furthermore, while the above description uses the lock actuator 58 to fix the charging lid 28 at the closing position by engaging the engaging hook with the striker 28a, the present invention is not limited to this, and the lock mechanism may be configured by another component.

While in the above description the positive electrode and the negative electrode of the battery 13 are provided with the relays 32 and 33 respectively, the present invention can be applied to an electric vehicle that only has the relay 32 at the positive electrode and a electric vehicle that only has the relay 33 at the negative electrode. However, from a viewpoint of improvement in safety during the charging operation, it is preferable that both the positive and negative electrodes of the battery 13 should be provided with the relays 32 and 33 respectively. Further, while the above description performs the relay diagnosis control after charging of the battery 13 is complete, the present invention is not limited to this. Alternatively, the relay diagnosis control may be performed before charging of the battery 13. The illustrated electric vehicle 11 is an electric vehicle which only has the motor-generator 20 for propulsion, but may be a hybrid-type electric vehicle that includes a motor-generator and an engine for propulsion. Furthermore, the battery 13 which is a lithium-ion rechargeable battery, a nickel metal hydride rechargeable battery or the like is used as the electric storage device, but the present invention is not limited to this. Alternatively, a capacitor such as a lithium-ion capacitor and an electric double layer capacitor may be used as the electric storage device.

What is claimed is:

1. An electric charging system in which an electric vehicle is provided with a power receiving connector that is connected to an electric storage device via a relay unit, and the power receiving connector is connected to a power supply connector of an electric charger, whereby charging power is supplied to the electric storage device from the electric charger, the electric charging system comprising:
    a information storage unit that stores information on a weld failure that occurs at the relay unit;
    a connection detection unit that detects a connection state between the power receiving connector and the power supply connector;
    a first warning unit that issues a sound-based warning when the power receiving connector is not connected to the power supply connector under a state where a weld failure occurs at the relay unit and does not issue a sound-based warning when the power receiving connector is connected to the power supply connector under a state where a weld failure occurs at the relay unit; and
    a second warning unit that issues a light-based warning when a weld failure occurs at the relay unit, regardless of the connection sate of the power receiving connector and the power supply connector, wherein
    the relay unit includes a first relay that is disposed at one of a pair of current carrying lines connecting the electric storage device and the power receiving connector and a second relay that is disposed at the other one of the pair of the current carrying lines;
    a sound-based warning issued by the first warning unit when a weld failure occurs at both of the first relay and the second relay is different from a sound-based warning issued by the first warning unit when a weld failure occurs at either one of the first relay and the second relay; and
    a light-based warning issued by the second warning unit when a weld failure occurs at both of the first relay and the second relay is different from a light-based warning issued by the second warning unit when a weld failure occurs at either one of the first relay and the second relay.

2. The electric charging system according to claim 1, wherein
    a cover that covers the power receiving connector is provided, and
    under a state in which a weld failure occurs at the relay unit and the power receiving connector is not covered by the cover, the first warning unit issues a sound-based warning when the power receiving connector is not connected to the power supply connector and does not issue a sound-based warning when the power receiving connector is connected to the power supply connector.

3. The electric charging system according to claim 1, wherein
    a lock mechanism is provided that fixes the cover at a position for covering the power receiving connector when a weld failure occurs at both of the first relay and the second relay, and releases the fixing of the cover when a weld failure occurs at either one of the first relay and the second relay.

4. An electric vehicle in which a power receiving connector is provided that is connected to an electric storage device via a relay unit and is connected to a power supply connector of an electric charger when the electric storage device is charged, the electric vehicle comprising:
    an information storage unit that stores information on a weld failure that occurs at the relay unit;
    a connection detection unit that detects a connection state between the power receiving connector and the power supply connector;
    a first warning unit that issues an sound-based warning when the power receiving connector is not connected to the power supply connector under a state where a weld failure occurs at the relay unit and does not issue a sound-based warning when the power receiving connector is connected to the power supply connector under a state where a weld failure occurs at the relay unit; and
    a second warning unit that issues a light-based warning when a weld failure occurs at the relay unit, regardless of the connection sate of the power receiving connector and the power supply connector, wherein
    the relay unit includes a first relay that is disposed at one of a pair of current carrying lines connecting the electric storage device and the power receiving connector and a second relay that is disposed at the other one of the pair of the current carrying lines;

a sound-based warning issued by the first warning unit when a weld failure occurs at both of the first relay and the second relay is different from a sound-based warning issued by the first warning unit when a weld failure occurs at either one of the first relay and the second relay; and a light-based warning issued by the second warning unit when a weld failure occurs at both of the first relay and the second relay is different from a light-based warning issued by the second warning unit when a weld failure occurs at either one of the first relay and the second relay.

5. The electric vehicle according to claim 4, wherein a cover that covers the power receiving connector is provided, and under a state where a weld failure occurs at the relay unit and the power receiving connector is not covered by the cover, the first warning unit issues a sound-based warning when the power receiving connector is not connected to the power supply connector and does not a sound-based warning when the power receiving connector is connected to the power supply connector.

6. The electric vehicle according to claim 5, wherein a lock mechanism is provided that fixes the cover at a position for covering the power receiving connector when a weld failure occurs at both of the first relay and the second relay, and releases the fixing of the cover when a weld failure occurs at either one of the first relay and the second relay.

\* \* \* \* \*